United States Patent
Katta

(10) Patent No.: US 12,045,333 B1
(45) Date of Patent: Jul. 23, 2024

(54) METHOD AND A DEVICE FOR USER VERIFICATION

(71) Applicant: aapoon, Inc., Houston, TX (US)

(72) Inventor: Srinivasa Katta, Austin, TX (US)

(73) Assignee: AAPOON, INC., Houston, TX (US)

( * ) Notice: Subject to any disclaimer, the term of this patent is extended or adjusted under 35 U.S.C. 154(b) by 0 days.

(21) Appl. No.: 18/386,748

(22) Filed: Nov. 3, 2023

(51) Int. Cl.
  *G06F 21/32* (2013.01)
  *G06V 40/16* (2022.01)

(52) U.S. Cl.
  CPC ............ *G06F 21/32* (2013.01); *G06V 40/172* (2022.01)

(58) Field of Classification Search
  CPC .............................. G06F 21/32; G06V 40/172
  USPC ............................................................ 726/5
  See application file for complete search history.

(56) References Cited

U.S. PATENT DOCUMENTS

| | | | | |
|---|---|---|---|---|
| 10,164,975 B1* | 12/2018 | Son | ........................ | H04N 23/00 |
| 11,496,458 B1* | 11/2022 | Anand | ................... | H04L 67/141 |
| 2012/0123786 A1* | 5/2012 | Valin | ........................ | G06Q 30/02 |
| | | | | 705/26.1 |
| 2012/0314911 A1* | 12/2012 | Paul | ........................ | G06V 40/70 |
| | | | | 382/115 |
| 2013/0132091 A1* | 5/2013 | Skerpac | .................... | G07C 9/37 |
| | | | | 704/273 |
| 2014/0133710 A1* | 5/2014 | Hama | ...................... | G06F 21/32 |
| | | | | 382/115 |
| 2015/0341370 A1* | 11/2015 | Khan | ...................... | H04L 63/20 |
| | | | | 726/30 |
| 2016/0162729 A1* | 6/2016 | Hagen | .................... | G06V 40/67 |
| | | | | 382/118 |
| 2017/0116870 A1* | 4/2017 | Brem | ........................ | G09B 5/04 |
| 2019/0013026 A1* | 1/2019 | Feng | ........................ | G10L 25/51 |
| 2019/0251380 A1* | 8/2019 | Park | ........................ | G06V 40/193 |
| 2020/0218916 A1* | 7/2020 | Wu | .......................... | G06V 40/40 |
| 2022/0108102 A1* | 4/2022 | Balaji | ...................... | G06F 16/13 |
| 2022/0138298 A1* | 5/2022 | Law | .......................... | G06F 21/32 |
| | | | | 726/7 |
| 2022/0374626 A1* | 11/2022 | Timoshenko | ........ | G06V 40/166 |
| 2023/0107624 A1* | 4/2023 | Keith, Jr. | ................ | G06F 21/32 |
| | | | | 704/249 |

(Continued)

FOREIGN PATENT DOCUMENTS

| | | |
|---|---|---|
| CN | 109344590 A | 2/2019 |
| WO | 2019104930 A1 | 6/2019 |
| WO | 2022010022 A1 | 1/2022 |

*Primary Examiner* — Dereena T Cattungal
(74) *Attorney, Agent, or Firm* — Shumaker, Loop & Kendrick, LLP

(57) ABSTRACT

A method for user verification that includes scanning a photo ID of the user. A user image is extracted from the scanned photo ID. Further, a random task is generated to be performed by the user. A video is recorded to capture execution of the generated random task. The recorded video is processed to extract an audio segment and one or more image frames from the recorded video. The random task performed by the user is validated based on the extracted audio segment and the extracted one or more image frames. A user image from the extracted one or more image frames is identified. The extracted user image is compared from the scanned photo ID with the identified user image. The user is authenticated based on a successful match between the extracted user image and the identified user image, and successful execution of the generated random task.

14 Claims, 8 Drawing Sheets

(56) References Cited

U.S. PATENT DOCUMENTS

| | | | |
|---|---|---|---|
| 2023/0128577 A1* | 4/2023 | Schei | G06V 40/166 726/18 |
| 2023/0290187 A1* | 9/2023 | Meng | G06V 40/171 |

* cited by examiner

METHOD AND A DEVICE FOR USER VERIFICATION

PRIORITY INFORMATION

The present application does not claim a priority from any other application.

TECHNICAL FIELD

The present subject matter described herein, in general, relates to verification of a user and, more particularly, to multistep verification of the user.

BACKGROUND

The field of user verification has witnessed significant advancements in recent years, driven by the increasing need for secure and reliable identity authentication systems across various applications. However, the progress has also brought about new challenges, particularly in light of the emergence of deep fake technology. Deep fakes, which employ cutting-edge Artificial Intelligence (AI) algorithms, have the potential to jeopardise the reliability of user verification procedures by effectively imitating real users' traits. This brings up serious issues with identity theft, data security, and privacy violations. Detecting the user's liveness or making sure that the biometric data is coming from a live, physically present person is a crucial part of addressing these problems. Thus, there is a need for a system to counter the dangers of deep fake techniques and verify users by authenticating their liveness.

SUMMARY

Before the present device(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a device and a method for verification of a user. This summary is not intended to identify essential features of the claimed subject matter nor is it intended for use in determining or limiting the scope of the claimed subject matter.

In one implementation, a method for verification of a user is described. The method comprises scanning a photo ID of the user. The photo ID of the user may include a user image. The user image may be extracted from the scanned photo ID. Further, a random task may be generated to be performed by the user. Furthermore, a video may be recorded to capture an execution of the generated random task. The recorded video may be processed to extract an audio segment and one or more image frames from the recorded video. Further, the random task performed by the user is validated based on the extracted audio segment and the extracted one or more image frames. A user image from the extracted one or more image frames is identified. The extracted user image is compared from the scanned photo ID with the identified user image and finally the user is authenticated based on a successful match between the extracted user image from the scanned photo ID and the identified user image, and successful execution of the generated random task. In one aspect, the aforementioned method for a user verification may be performed by a processor using programmed one or more instructions stored in a memory.

In another implementation, a device for verification of a user is described. The device is configured to scan a photo ID of the user. The photo ID of the user includes a user image. The user image is extracted from the scanned photo ID. Further, a random task is generated to be performed by the user. A video is recorded to capture execution of the generated random task. The recorded video is processed to extract an audio segment and one or more image frames from the recorded video. Further, the random task performed by the user is validated based on the extracted audio segment and the extracted one or more image frames. A user image from the extracted one or more image frames is identified. The extracted user image is compared from the scanned photo ID with the identified user image and finally the user is authenticated based on a successful match between the extracted user image from the scanned photo ID and the identified user image, and successful execution of the generated random task.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for a user verification disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
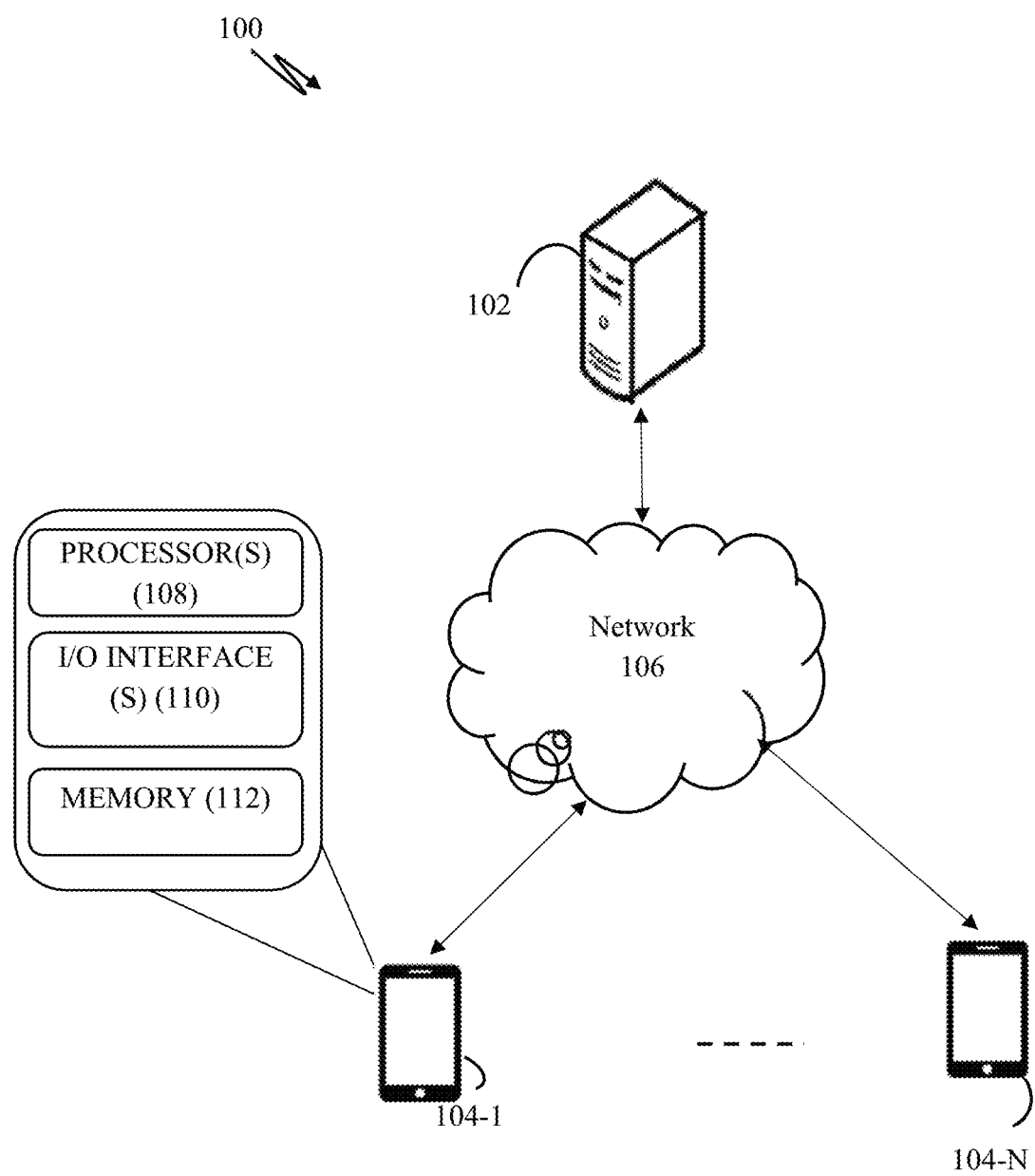
FIG. 1 illustrates a network implementation of a user device for verification of user, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "scanning," "generating," "extracting," "providing," "processing," "prompting," "determining," "comparing", "recording", and "authenticating" and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any device and methods similar or equivalent to those described herein can be used in the practice or testing of embodiments of the present disclosure, the exemplary, device and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a device for verification of a user. With the growth of online interactions and transactions, it is crucial to ensure the authenticity and liveness of users and provide protection from deep fake manipulations. Authentic users must be distinguished from fake entities since malicious individuals can now generate convincing imitations using sophisticated techniques, may be but not limited to artificial intelligence, deep learning, automated tools, and the like. This is especially important in areas like data access, identity verification, and financial transactions. Multi-level methods of verification, presented in the instant application, offer an effective solution for the above said problems. The presented method enhances defence against fraudulent actions by using a variety of indicators, such as textual content, visual comparisons, and dynamic features indicating user liveness. As generally understood, liveness detection is used to determine that the user being verified is physically present in front of a device. Not only credentials of the user be verified for validity, but the user must also be present and actively participating. The difficulties posed by deep fakes and synthetic media highlight the necessity of a thorough approach to verification. Therefore, multi-step verification of the user is required to authenticate the liveliness of the user.

In the present invention, in a preferred embodiment a user verification takes place within an offline environment, distinguishing it from the typical online verification processes conducted over network connections. The method stores different instructions required for user verification directly on the user's device. The method allows for a verification process that operates independent of external network connections. By utilizing the resources and capabilities of the user's device, the method ensures that the verification actions are executed seamlessly, securely, and efficiently. This approach not only enhances user privacy but also provides a robust means of identity confirmation while minimizing the reliance on external infrastructure, marking a significant departure from conventional online verification methodologies.

Referring now to FIG. 1, a network implementation 100 for user verification is disclosed. In an embodiment, an application may be installed on one or more user devices 104-1 . . . 104-N, collectively referred to as user device 104 (hereinafter), such as the user device 104 interacts with the installed application to perform one or more steps for user verification. The application may include various steps of the user verification performed by the present invention. Initially, the user device 104 may scan a photo ID and process the scanned photo ID and a recorded video for the user verification. Examples of the user devices 104 may include, but are not limited to, a portable computer, a personal digital assistant, a handheld device, and a workstation. The user device 104 is communicatively coupled to a system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the user device 104 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112. In another embodiment, the user device 104 may include more than one processor cores to perform one or more steps discussed in FIG. 2 and FIG. 3 of the present disclosure.

The I/O interface 110 may include a variety of software and hardware interfaces, for example, a web interface, a graphical user interface, and the like. The I/O interface 110 may allow the user device 104 to interact with the user directly or through the system 102. Further, the I/O interface 110 may enable the user device 104 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic Random Access Memory (DRAM), and/or non-volatile memory, such as Read-Only Memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the user device 104. In one embodiment, the memory 112, amongst other things, serves as a repository for storing data processed, received, and generated by one or more of the programs or the coded instructions.

In an alternate embodiment, the user device 104 may scan the photo ID and transmit the scanned photo ID to the system 102. The system 102 may be configured to perform the one or more steps for user verification disclosed in the present disclosure. The system 102 may be implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. The system 102 may be accessed by multiple users through one or more user devices 104-1, 104-3 ... 104-N via network 106. The user may register the user devices 104 using the I/O interface 110 in order to use the system 102. In one implementation, the system 102 may comprise the cloud-based computing environment in which the user may operate individual computing systems configured to execute remotely located applications. The system 102 may include at least one processor (not shown), an input/output (I/O) interface (not shown), and a memory (not shown) to perform the one or more steps related to the user verification.

As there are various challenges observed in the existing art, the challenges necessitate the need for a robust user verification method or a system that is able to mitigate the risk of deep fake profiles being active on a platform. At first, a user may access an application installed on the user device 104 via the I/O interface 110. The user device 104 may interact with the installed application to perform one or more steps required for the user verification. The detailed functioning of the user device 104 is described below with the help of figures.

Figure 2A:
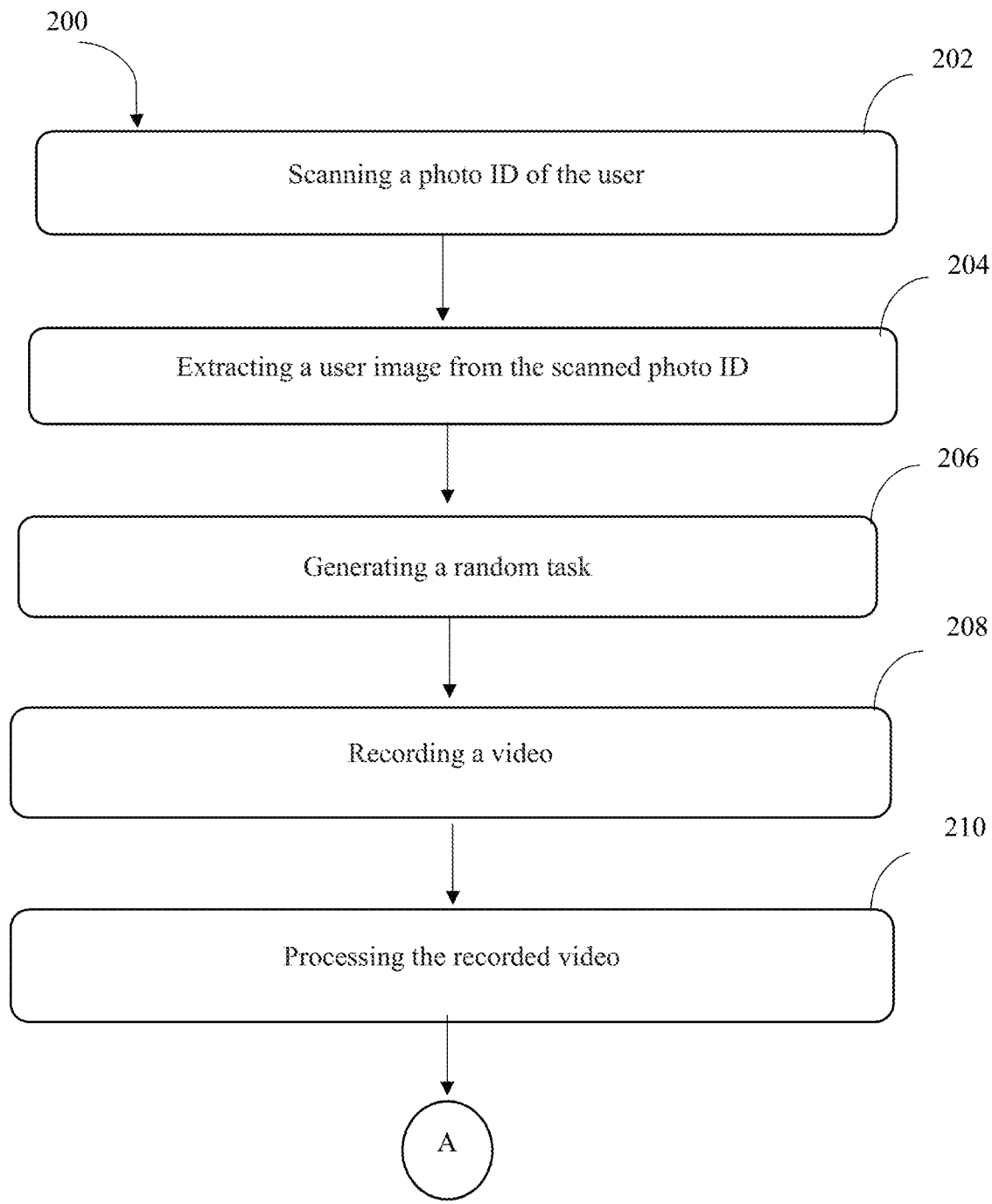
FIGS. 2a and 2b illustrates a method for user verification, in accordance with an embodiment of the present subject matter.
Figure 2B:
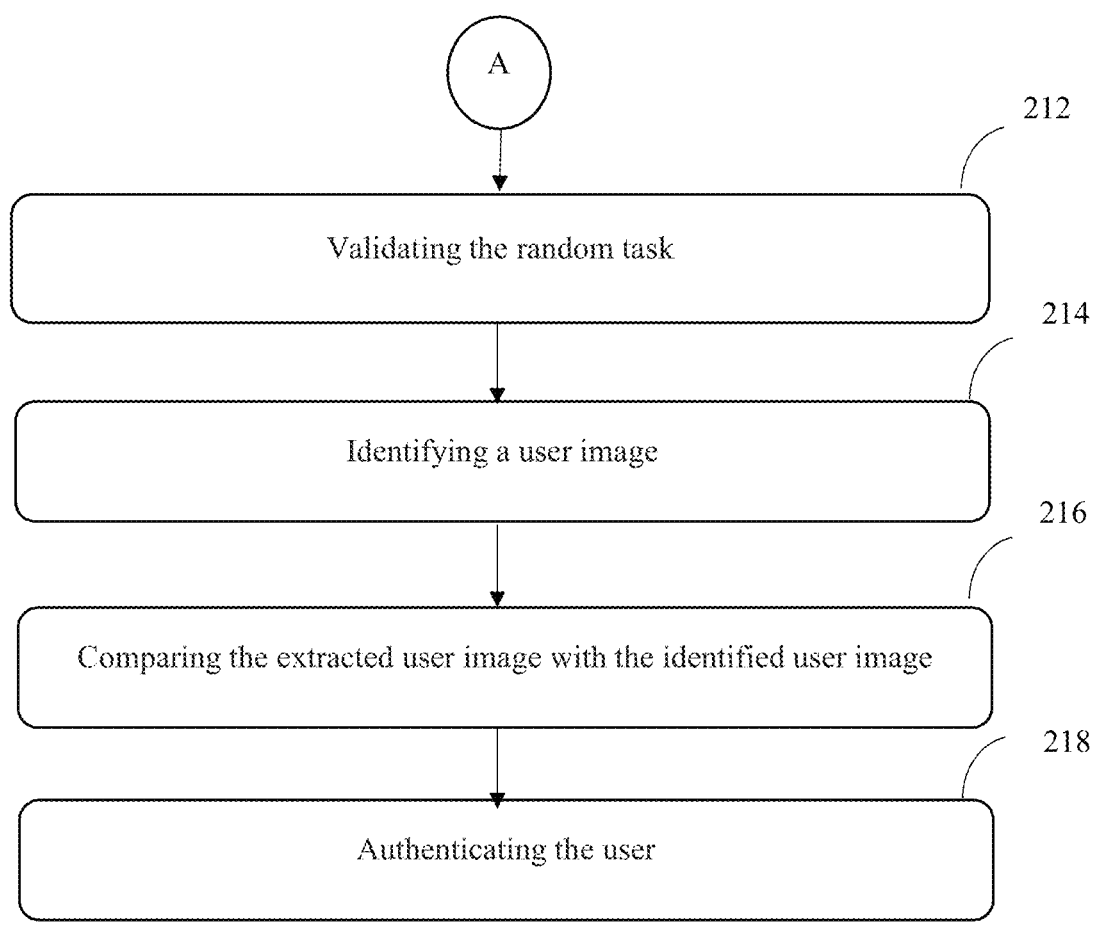

Referring now to FIGS. 2 (2a and 2b), a method 200 for a user verification is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for a user verification. Additionally, individual blocks may be deleted from the method 200 without departing from the scope of the subject matter described herein. Furthermore, the method 200 for user verification can be implemented in any suitable hardware, software, firmware, or combination thereof. However, for ease of explanation, in the embodiments described below, the method 200 may be considered to be implemented in the above-described user device 104.

At step 202, a photo identity document (ID) of the user may be scanned to perform a verification of the user. Any official identification document with relevant user information and a representative user image qualifies as a photo ID, including but not limited to a driver's license, passport, or any other government-issued ID. The photo ID plays a significant role in the verification process by acting as an authentic point of reference for user's identity. In an embodiment, the photo ID may be scanned using the built-in scanner or camera on the user device 104. When the user initiates the verification process, the user device 104 may scan the photo ID to capture an image of the photo ID. In an example, the user may be instructed to place the user photo ID correctly within the scanning region. In an embodiment, the scanned image may be processed to obtain relevant information for the user verification. To make sure the ID's details are readable and recognisable, image enhancement processes like cropping, resizing, and enhancing clarity may be used.

Figure 7:
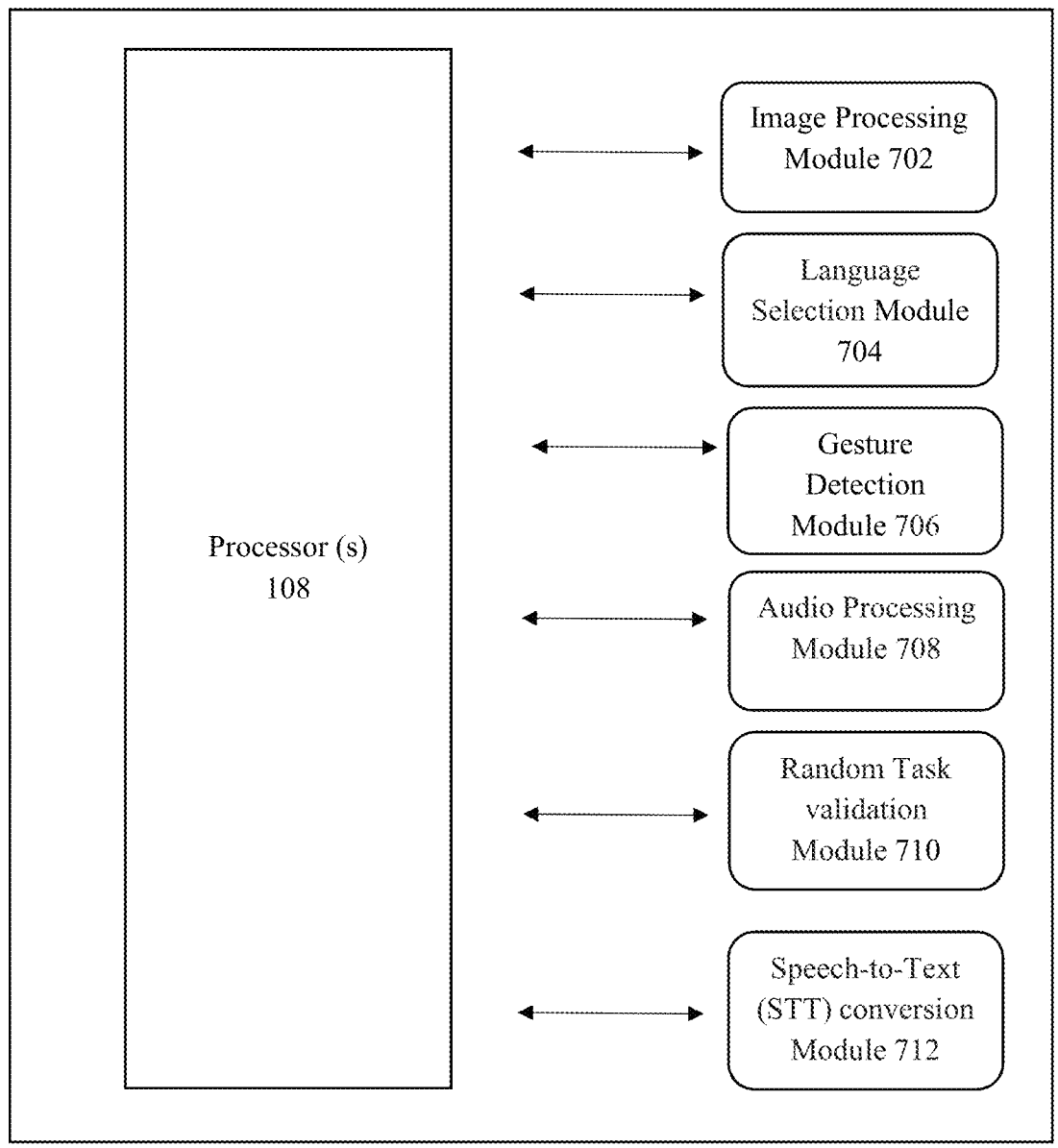
FIG. 7 illustrates various modules interacting with the AI subsystem, in accordance with an embodiment of the present subject matter.

At step 204, the processor of the user device 104 is configured to extract a user image from the scanned photo ID. In an embodiment, the user device 104 may include image processing capabilities via an image processing module 702 (as shown in FIG. 7). When the user initiates the verification process by scanning the photo ID, the user device may use image processing techniques to locate and extract the user's image from the scanned photo ID. This may involve identifying the region of interest (ROI) within the photo ID, enhancing the image quality, and ensuring that the extracted image meets the necessary resolution and size requirements for verification.

Further, at step 206, the processor generates a random task to be performed by the user. The random task may be generated using one or more algorithms. The random tasks may be a computational operation or problem generated by the processor using the one or more algorithms like but not limited to Pseudorandom Number Generators, True Random Number Generators, and the like. The user may not anticipate the task in advance. The generated random task is provided to the user on the user device 104. In an embodiment, the random generated task may be provided with a help of a visual cue. In order to direct the user in carrying out the action, the visual cue may comprise showing a picture, an animation, or text on the user's device interface. In yet another embodiment, the random task may be provided with a help of an audio cue. The audio cue involves providing spoken or sound-based instructions to guide the user in performing the task. In an alternate embodiment, the processor is a multiprocessor system or processor with more than one processing cores such that different user verification steps are performed by combination of multiple processing cores.

Further, in an embodiment the random generated task may correspond to reciting an alphanumeric phrase displayed on the user device 104. The alphanumeric phrase may be a string of characters that combines alphabetic letters (both uppercase and lowercase) with numeric digits (0-9). The alphanumeric phrase may be of a specific length and may be generated using a secure random number generator (RNG). The alphanumeric phrase may be generated within the range of the character set. In an embodiment, a character set to generate alphanumeric phrases is defined. The character set may include uppercase letters (A-Z), lowercase letters (a-z), and numeric digits (0)-9). A desired length of the alphanumeric phrase that is to be generated is determined. Further, a random number generator may be selected to select characters from the defined character set. This process may be repeated until the desired length of the alphanumeric phrase is generated. The alphanumeric phrase may be presented to the user on the user device 104 via a user device interface. The user may perform the random generated task in front of the camera of the user device 104. In one of the embodiments, a user may perform the random task in the view of a front camera a mobile device 104 such that the user is able to see the task being performed in real time. For instance, a camera of the user device 104 is switched on in a selfie mode and user can see a response to the alphanumeric phrase recitation in real time. In another embodiment, the user may be able to see the other random tasks such as various hand gestures, head movements, eye and lip movements in the camera of the user device 10 while performing the random generated task.

Additionally, in an embodiment the processor of the user device 104 may prompt the user to select a language from one or more languages for providing the alphanumeric phrase. The selection of the language may be, performed via a language selection module 704 (as shown in FIG. 7), presented to the user through a user device interface. The user may select a language from a menu or list provided via the user device interface. These language choices are made to accommodate the user's linguistic preferences and comprehension. The languages provided by the user device may depend on, but not limited to, a location of the user, user profile data, and alike. For example, the user device automatically generates the list of languages that are available to be chosen based on the user's device's location. For instance, English, French, Mandarin, Spanish, specific regional languages such as Punjabi, Telugu, and Hindi might be offered as alternatives if the device is in a place where a particular language is widely spoken. In an embodiment, the user device 104 may use contextual language selection. For instance, if a user of the user device 104 browses a webpage related to a particular country or based on browsing history of the user, the device 104 may prioritize the language spoken in that region and may include the language as a top priority in the list of languages.

In yet another example, the user device 104 may take into account data from the user's profile, such as preferred language settings, previous contacts with the device, or language history. For example, the user device 104 may automatically determine and select the user's preferred language based on various factors such as user profile, location, browser settings, or device settings. In an embodiment, user interaction analysis may be used to determine the preferred language. For example, user interactions and behaviour patterns may be analysed to dynamically adjust language settings based on user engagement or historical preferences. This information aids in customising the user's language selections. Once the user selects a language, the user device generates the alphanumeric phrase in that chosen language. In an embodiment, this may include translating alphanumeric characters, instructions, and any other textual elements into the selected language. The processor of the user device may be configured to display the generated alphanumeric phrase in the selected language, on the user device via a graphical user interface. In yet another embodiment the random generated task may be to recite the alphanumeric phrase along with performing one or more of eye blink, hand gestures, head motion, lip movement, and the like.

In an embodiment, the processor of the user device may be configured to detect one or more gestures performed by the user while performing the random generated task. The gestures may be specific movements, positions, or actions made by the user to convey information or interact with the environment. The one or more gestures include but not limited to eye blink, lip movement, head motion, and hand gesture. The user device 104 may include a gesture detection module 706 (as shown in FIG. 7) to detect the one or more gestures. The gesture detection module may interpret and recognise user's one or more gestures by processing input from devices like camera, sensors, or other motion-sensing equipment coupled with the user device 104. In one implementation, the processor may examine how the eyes change over time in order to detect eye blinks. This may involve monitoring eyes over a predefined time and tracking an eye state. Frames of the user's image are continuously captured, and the state of the eye is monitored. This involves analysing changes in the distance between the eyelids, the frequency of eyelid closures, or other eye-related features. Frame-by-frame analysis or more methods that have already been established or could be developed in the future may be used by one or more algorithms to track eye movement. For example, frame rate for eye tracking may range from 30 to 120 frames per second (FPS) depending upon the requirement. Higher frame rates may provide more detailed and accurate tracking of fast eye movements. In one implementation, the processor may monitor the user's lips over time to track lip movements and shape changes in order to detect lip movement. By comparing the locations of distinct lip landmarks in successive frames, this can be accomplished. For example, a dataset of images or videos comprising user speaking or moving their lips may be obtained. The obtained data set may be pre-processed to extract lip regions and align facial landmarks. The processor may further extract the features from the lip region, like but not limited shape, texture, or color, to perform lip movement analysis. The processor may utilise one or more machine learning models or deep learning models like Convolutional Neural Networks (CNN), Recurrent Neural Networks (RNNs), Hybrid CNN-RNN Models, Temporal Convolutional Networks (TCNs), and the like. The training of the one or more machine learning models may be performed by annotating dataset to label the lip movements or classes that may be required to detect for e.g., open, closed, smile, or specific phonetic movements of the lips. The data set may be split into training, validation, and testing sets. The training data set is used to train the model, the validation data set is used to evaluate the one or more machine learning model during training, and the testing data set is used to evaluate the one or more machine learning model's performance after training. The trained one or more machine learning models may be used for real time inference on new input data based on the learned patterns and relationships between the input features and the corresponding lip movement labels. The one or more machine learning models are continuously trained to provide improved results.

The machine learning model is continuously fed with feedback to further improve the predictions or inference drawn based on the past predictions.

To perform head motion tracking, the processor, in an embodiment, may monitor the change in position and orientation of the user's head. This may involve estimating the angles of rotation (yaw, pitch, and roll) based on the movement of key facial landmarks. To increase accuracy, inertial sensors like gyroscopes and accelerometers may also be utilised in conjunction with visual analysis.

In an embodiment, the processor may recognize the hand gestures by detecting and tracking the user's hands within the video frames. This may be performed using techniques like background subtraction, motion analysis, or deep learning-based hand detectors. Gesture recognition models may identify particular gestures based on the positions and motions of the hands after hand detection.

Figure 6:
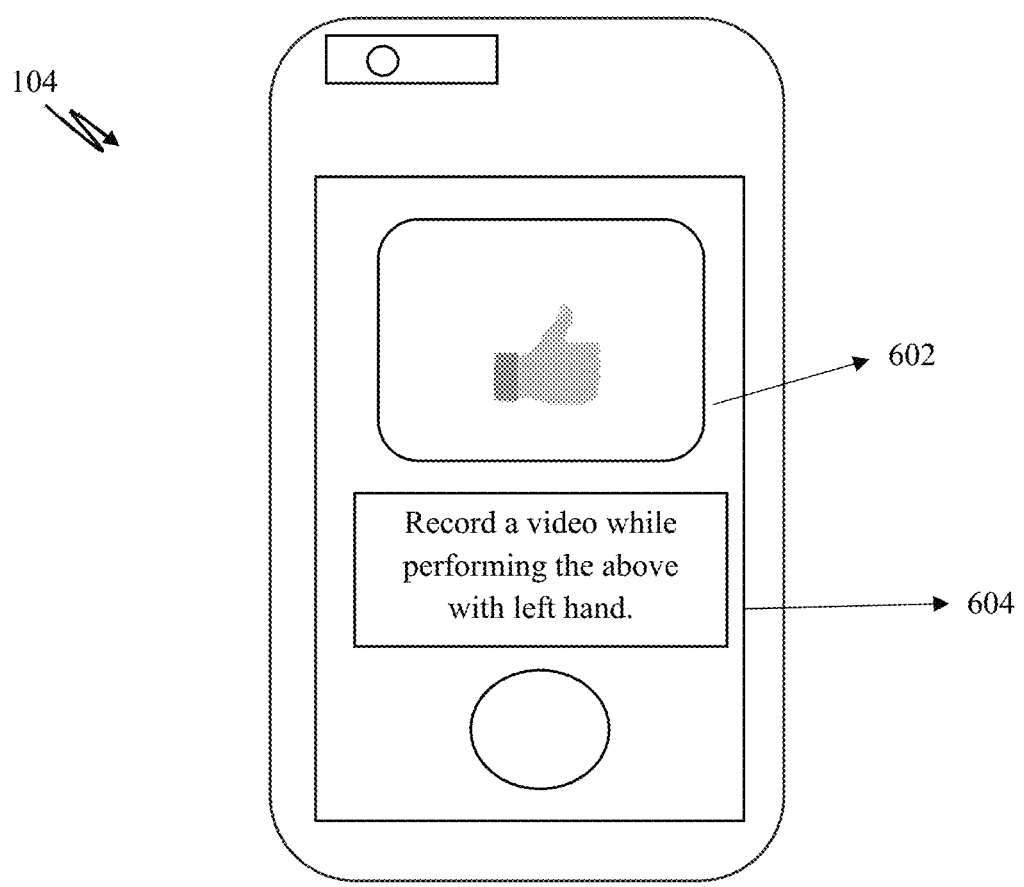
FIG. 6 illustrates an interface of the user device displaying the generated random task, in accordance with an embodiment of the present subject matter.

In an embodiment, the processor is configured to record a video to capture the execution of the generated random task, at step 208. In an embodiment, the processor may prompt the user, via user device interface, to record the video to capture the execution of the generated random task. The processor may prompt the user via the user device. The processor may use User Interface (UI) components that are interactive, such as buttons, banners, or pop-up notifications, to display the prompts. The UI components may be placed in one or more ways to direct the user's attention and encourage them to start recording videos. In an embodiment, upon selection of one or more UI components, the user device 104 may record the video. In yet another embodiment, when no explicit selection of the UI components occurs, the user device 104 may automatically initiate video recording based on predefined conditions or triggers. The video recording may capture at least voice of the user and one or more images of the user to capture execution of the randomly generated task. In an embodiment, the image of the user may be captured while performing one or more of head motions, hand gestures, lip movement, eye blink, recognizing distorted text, deciphering audio captchas, solving math problems, pattern recognition within images, language translation, answering general knowledge questions, behavioural analysis, picture matching, solving logical puzzles, colour recognition, behavioural biometrics analysis, pattern drawing, sequence verification, and the like. For example, as shown in FIG. 6, the user may be prompted with a random generated task related to hand gestures for example, the user is prompted to do a thumbs up while recording the video. In an embodiment, the user may be given instructions on how to turn on their device's camera so that video recording may begin. The user records the video while speaking the alphanumeric phrase aloud during the recording phase. This act demonstrates that the user is actively participating in the verification process both visually and vocally. In an embodiment, the user may stop the video recording once they have finished reciting the alphanumeric phrase. In yet another embodiment, the user may be given a specific period of time to record the video and after the specified time, the video recording may automatically be stopped. The processor may prompt the user via the interface to save or discard the recorded video. The user may discard the video and record a new video if the user is not satisfied by the captured video. In an embodiment, the processor may assign a score upon successful execution of the random generated task. The score may indicate if the task has been successfully executed or not. In an embodiment, when the score is above a predetermined threshold the task may be said to be successfully executed. The threshold may represent the minimum predicted probability score that a video must achieve to be considered successful. The score may depend upon audio quality for example, clarity of audio, video quality for example, resolution, clarity, how well the user may be framed, content and relevance, and the like. For example, to determine the score a suitable machine learning model for binary classification, such as Logistic Regression, Support Vector Machine (SVM), or Random Forest, may be utilized. The model may be trained using data like a diverse dataset of video recordings representing a variety of recording conditions, qualities, and styles. The video recordings in the data set be labelled as either successful or unsuccessful based on predetermined criteria such as video quality, stability, composition, audio levels, noise levels, clarity, shakiness, smoothness of video transitions, resolution, frame rate, bit rate, and the like. The trained model predicts score for each video based on the training data set.

In an embodiment, the recorded video is processed by the processor of the user device 104. The recorded video is processed to extract an audio segment and one or more image frames, at step 210. The processor may utilise an audio processing module 708 (as shown in FIG. 7) to process the recorded video. For example, the recorded video may comprise at least an audio segment. The user's spoken recitation of the alphanumeric word is captured in the audio segment. The user device may use audio processing techniques to extract the audio segment from the recorded video. For example, to isolate the audio segment, the audio and video parts of the recorded video is demultiplexed using standard techniques. For instance a Fourier transform (FFT or STFT) may be applied to analyse the audio segment in the frequency domain. The FFT or STFT may convert the audio segment from the time domain to the frequency domain. This transformation allows to study the audio segment in terms of its frequency components. The frequency domain representation may be analysed to identify the specific frequency components that correspond to the audio segment that is to be isolated. An inverse Fourier transform may be performed to convert the selected frequency components back to the time domain resulting in a separated audio signal containing the desired audio segment. In an embodiment, to improve the quality and utility of the audio segment, preprocessing procedures like but not limited to noise reduction, filtering, and resampling may be applied. The audio segment that is produced is a clear recording of the user repeating the alphabetic phrase.

In an embodiment, the recorded video may include an image segment including one or more frames of the user's face and expressions, body part movement, or gestures, as they speak. In an embodiment, the processor is configured to extract the one or more image frames from the recorded video. The processor may iterate through the recorded video frame by frame and may extract frames at a specific frame rate for example, like 24, 30, 29.97, 25, 50, 60 fps, and the like. Each frame may be a still image representing a moment in the recorded video. The one or more extracted image frames are processed to focus on the user's face and expressions. For example, the frames may be first prepared for analysis through image preprocessing. Further, face detection algorithms may identify faces and facial landmark detection identify crucial facial landmarks that allow for the interpretation of facial expressions using machine learning models. A region of interest is determined from the above processes which may be further enhanced for better visibility.

In an embodiment, the processor is configured to validate the random task performed by the user based on the extracted audio segment and the extracted one or more image frames, at step 212. The processor may be configured to validate the random task by utilising a random task validation module 710 (as shown in FIG. 7). For example, but not limited to, in an embodiment, the random generated task was to record a video while performing a hand gesture and reciting the alphanumeric phrase displayed on the user device. In this scenario, the processor may analyse the audio segment for the spoken characters and analyse the one or more image frames for evidence of hand gestures in the user's image. The audio analysis may involve speech recognition to transcribe and verify that the user recited the correct alphanumeric phrase. The processor may use a machine learning model or an algorithm for the analysis. For example, The machine learning model or the algorithm may be trained using a dataset that included instances of activities that were successfully completed and tasks that were left unfinished, audio recording of users speaking correct alphanumeric phrase, audio recordings of users speaking incorrect alphanumeric phrase, recordings from users to account for voice variances, including those with different accents and dialects, recordings with different voice tempos to reflect the user's potential speaking rate, recordings recorded in various settings with variable levels of background noise to reflect actual circumstances, audio recordings of users purposefully pronouncing or mispronouncing the numerical phrases, recordings from a variety of users to record a range of pronunciations and speech patterns, recordings done with various equipment to account for differences in audio quality (such as phones and microphones), recordings with different speech intensities and loudness levels, recordings from users to record demographic variances, including users of various genders and ages, recordings of the same phrase made several times to ensure consistency, recordings made throughout the week or at various times of the day to account for differences in speech caused by things like exhaustion or the time of day To make determination, the processor may contrast the extracted audio and visual data with patterns and features discovered during training. In an embodiment, the processor may establish confidence score for random task completion. If the confidence score exceeds a predetermined threshold, the processor concludes that the user has performed the task successfully. In yet another example, the random generated task may be one or more of recitation of the alphanumeric phrase, head motion, eye blink, lip movement, hand gestures, and the like.

Figure 3:
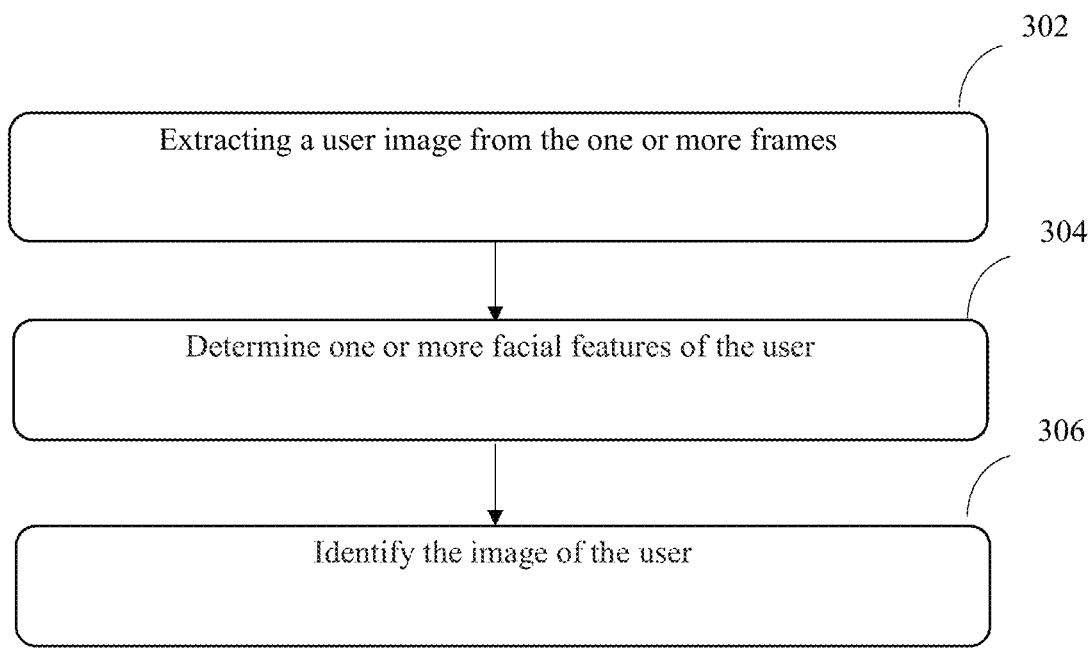
FIG. 3 illustrates a method for extracting user image from one or more frames, in accordance with an embodiment of the present subject matter.

In an embodiment the processor is configured to identify the user's image from the extracted one or more image frames, at step 214. FIG. 3 illustrates a process for identifying the user's image from the one or more image frames. In an embodiment, the processor may choose a plurality of frames from the extracted frames that clearly and prominently show the user's face. For example, the processor may identify and locate faces within each frame of the video by using one or more face detection algorithms like Haar cascades, HOG (Histogram of Oriented Gradients), or deep learning-based models like MTCNN (Multi-Task Cascaded Convolutional Networks). The frame detection algorithms may utilise parameters like, but not limited to, lighting, facial angle, and image quality, and many more to choose the plurality of frames. The frames having faces may be chosen as per the requirement, like frames where a face is detected with high confidence, frames where the face is centrally located, or occupies a certain portion of a frame.

At step 302, the user's image from the plurality of frames is extracted. The processor may use one or more facial detection techniques to extract the user's image from the plurality of frames. In yet another embodiment, the processor may use the facial detection techniques on the extracted one or more image frames. Following that, the processor may determine one or more facial features of the user in the extracted user image, at step 304. For example, the processor may determine markers of eyes, nose, mouth, and other distinguishing features. To precisely determine these features, the processor may use facial landmark identification or deep learning-based facial analysis. For example, in facial landmark identification, precise locations or landmarks on a face are determined that correspond to essential characteristics like eyes, noses, mouths, and other distinctive points. For example, such as the corners of eyes, the tip of nose, centre of mouth, and other recognisable facial features. Typically, in facial landmark identification, the process begins with analysing facial images using one or more algorithms. When an image containing a face is scanned, the one or more algorithms detect edges, corners, and gradients, which are essential cues for identifying facial features. This initial analysis helps determine potential areas of interest where facial landmarks might be located. Once the algorithm identifies these regions, it searches for patterns and shapes that match the predicted positions of facial landmarks based on a reference model. The reference model may comprise the expected spatial relationships between different facial features. For example, the model may indicate that the eyes are usually positioned above the nose and mouth. The algorithm may make use of different visual qualities like texture, colour, and shape to accurately identify the landmarks.

The processor may extract the landmark's exact coordinates using the algorithm. These coordinates tell where in the image the landmark is located. By using these, the processor is able to comprehend the landmark's position in respect to other face features. These landmarks' coordinates may also be used to map them onto a predetermined reference model. Through this mapping process, the landmarks are made uniform across many photos and poses. Consistent landmark locations can be achieved by minimising variations brought on by changes in illumination, angles, and face expressions.

In an embodiment, the processor may use deep learning based facial analysis to determine one or more facial features of the user in the extracted user image. The deep learning model is trained on a large data set comprising large set of facial images. The facial images may be annotated with manually marked facial landmarks like, but not limited to, eyes, corner of eyes, centre of mouth, position of lips, placement of nose. The machine learning model is trained to determine patterns and features in the images of the data set that correspond to facial landmarks. The trained model automatically extracts relevant features from facial images, such as edges, corners, textures, and gradients. When a new image is presented, the processor may use the trained machine learning model to predict the positions of facial landmarks based on the training data. For example, the machine learning model may predict a set of coordinates indicating the projected placements of face landmarks. In an embodiment, the processor may use Convolutional Neural Networks (CNNs), in deep learning-based facial analysis to automatically learn and extract facial information. The Convolutional Neural Networks (CNNs) may be used to automatically discover and extract facial features from a dataset of facial images. These networks may be taught to identify characteristics including gender, age, emotions, and distinctive face features. The CNNs may employ extractors that extract fine features and patterns from the images. The CNNs may be trained, to enable real-time analysis, such as face recognition or emotion detection, by processing new images.

The processor identifies the image of the user based on the determined one or more facial features of the user, at step 306. For example, the processor may be configured to identify the user image based on one or more techniques like feature mapping. In the feature mapping technique, the determined facial features are transferred to a reference model of the user's face. The reference model may be a collection of landmark features in a predetermined arrangement or a 3D depiction. In another example, the processor may use feature morphing process to identify the user image. In this process, the reference model's features are transformed and aligned to match the detected features. This creates a cohesive representation of the user's face. In yet another example, the processor may be configured to identify the image of the user using texture mapping. Texture mapping is the process of overlaying the reference model with the colours and tones from the retrieved image's original texture. By doing this, it is made sure that the created image keeps the user's actual skin tone and facial expressions.

In an embodiment, the processor at step 216 compares the extracted user image from the scanned photo ID with the identified user image from the extracted one or more image frames. In the context of FIG. 3 it has been explained in greater detail that how the user image would be identified from the extracted one or more image frames. Accordingly, the processor may utilise one or more feature extraction techniques from the user image in the scanned photo ID and image extracted from the one or more frames. For example, the processor may use Histogram of Oriented Gradients (HOG) for the extraction. In this technique it computes the gradient magnitude and orientation for each pixel within each cell by dividing the image into tiny, overlapping cells. The distribution of gradient directions in the image is then captured as histograms using these gradient magnitudes and orientations. The HOG features are useful for facial identification because they accurately describe the texture and shape of an object in the image. In yet another exemplary embodiment, the processor may use eigenfaces (Principal Component Analysis—PCA) technique. The face dataset's most notable changes are captured by the principal components (eigenfaces) identified through principal component analysis (PCA). A face may be represented using a reduced set of coefficients—the 'weights' of each eigenface for that face—by projecting a face image onto the eigenfaces. Eigenfaces provide a compact representation of facial features, making it efficient for recognition tasks. In yet another exemplary embodiment, the processor may use deep learning models. Convolutional neural networks (CNNs), in particular, have may be used in feature extraction for facial recognition. Face image embeddings may be extracted by pre-trained CNNs like FaceNet, VGGFace, or models trained on sizable datasets like ImageNet. The model learns hierarchical representations of facial features through multiple layers, capturing intricate patterns and details. These embeddings serve as highly discriminative representations of the face, which can be used for face verification or recognition tasks.

The processor, at step 218, authenticates the user based on a successful match between the extracted user image from the scanned photo ID and the identified user image, and successful execution of the generated random task. For example, the processor may generate a comparison score as result of the comparison between the extracted user image from the scanned photo ID and the identified user image. The comparison may be performed by using one or more method developed or to be developed in the future. In an embodiment, the extracted user image from the scanned photo ID and the identified user image may be compared using Structural Similarity Index (SSI). The structural similarity index compares the structural patterns, brightness, and contrast of two images to determine how similar they are. The SSI offers a score showing the degree of structural similarity. In yet another embodiment, the extracted user image from the scanned photo ID and the identified user image may be compared by using Mean Squared Error (MSE) method. The average squared variations between corresponding pixels in the images are determined by the Mean Squared Error (MSE) method. A lower MSE value indicates that the images are more comparable. In yet another embodiment, deep learning models may be used to calculate the similarity. Siamese networks and convolutional neural networks, for example, are examples of deep learning models that may be used to extract features and calculate comparison scores based on learnt representations. Deep learning models may also be created from scratch. When the generated comparison score is above a predetermined threshold value, the processor determines a successful match of the comparison. The comparison score acts as an indicator of how well the images have matched one another. When this score is higher than the set threshold, it indicates that there is a significant alignment between the extracted user image from the scanned photo ID and the identified user image.

In an embodiment, the predetermined threshold may be determined based on a machine learning model like a binary classification model (e.g., logistic regression, SVM, decision trees) trained with a dataset that includes pairs of images, along with labels indicating whether each pair is a match or not a match and comparison scores calculated between these images. These features will serve as input for the machine learning model and the objective of the model may be to learn a decision boundary that accurately predicts whether a pair of images is a match or not based on the comparison scores. The processor may evaluate the model's performance by selecting different thresholds and model may determine optimized threshold upon continuously being trained.

In an embodiment, the processor may generate a combined comparison score to authenticate the user as a live user based on a successful match between the extracted user image from the scanned photo ID and the identified user image from the extracted one or more image frames, and a successful execution of the generated random task. For example, the processor upon verifying if the random generated task has been successfully executed by the user along with the successful match between the images, authenticate the user as live user. In an embodiment, the successful match may be obtained when a combined comparison score may be above a predetermined threshold. For example, the combined score may include a total of score calculated from the execution of task, as discussed above and the comparison score calculated based on comparison of the images. For instance the image comparison is done for the extracted user image from the scanned photo ID and the identified user image from the extracted one or more image frames. In another example, the combined score may include an average score of the score calculated from the execution of task, as discussed above and the comparison score calculated of the images. In yet another example, the combined score may include weighted score of the score calculated from the execution of task, as discussed above and the comparison score calculated of the images. The processor may recommend the user for an additional verification if the generated combined comparison score is below the predetermined threshold.

In an embodiment the processor is configured to convert the extracted audio segment at step 212 into corresponding text. To this end, the processor identifies a language of speech in the extracted audio segment by using one or more language detection algorithms. The spoken recitation of the alphanumeric word by the user is isolated in the audio segment from the video that was recorded. The user's voice can be heard in the audio clip saying the alphanumeric phrase in the selected language. The Language detection algorithms may be employed to analyse the audio segment and identify the language being spoken. To extract pertinent characteristics that can discriminate between different languages, the audio clip is analysed. These features may include phonetic traits, auditory cues, spectral data, and speech patterns. The Language detection algorithms often use acoustic models, which are trained on diverse language samples, to recognize phonetic and prosodic patterns unique to different languages. The acoustic and language models are used to process the extracted audio segment, where language models represent the likelihood of sequences of words occurring in different languages. For a variety of languages, the algorithms calculate the probability scores. The language determined to be the most likely language of speech is the one with the highest likelihood score. For example, in some cases, multiple languages may have significant likelihood scores. In such scenarios, the algorithm may provide a list of potential languages ranked by their scores.

Once the language is identified, the processor is configured to select a language model based on the identified language to determine one or more of accents, a pronunciation, and a speech pattern. Accents are different speech patterns that result from influences from the language heritage, geographic location, and cultural background. They involve changes to pronunciation, intonation, rhythm, and stress patterns. The selected language model may inherently incorporate a comprehensive database of accents associated with the identified language. The language model may be trained to recognise the minute variations in these speech traits in order to recognise various accents. To determine the pronunciation, the selected language model may compare the input speech with the expected phonetic patterns and phoneme sequences of the identified language. The language model analyses the difference between the phonetic representation of the input and the standard phonetic representation for that language. To determine the speech pattern the language model may analyse the rhythm, stress, and intonation of the spoken language. The input is processed by the language model to find particular patterns that define the speech style. This can involve following up on details like rhythmic variations, rising or decreasing intonation, and stress on specific phrases or syllables.

The processor further converts the extracted audio segment into corresponding text. For example, the extracted audio segment is converted into a sequence of text tokens using one or more machine learning algorithms. The processor may utilise a speech-to-text (STT) conversion module 712 (as shown in FIG. 7) applying one or more STT algorithms like Hidden Markov Models (HMMs), Gaussian Mixture Models (GMMs), Deep Neural Networks (DNNs), Recurrent Neural Networks (RNNs), Convolutional Neural Networks (CNNs), and the like transform the user's spoken sentence into a textual representation by transcribing the audio segment into text. For example, the processor may obtain a dataset of audio samples with corresponding transcriptions (text labels). The processor may choose a suitable STT conversion algorithm based on the requirement and may train the model using the pre-processed audio features and corresponding transcriptions.

The processor is further configured to compare the converted corresponding text with the generated alphanumeric phrase. In an example, the processor may perform semantic analysis to perform character by character comparison of the converted text and the alphanumeric phrase. The processor authenticates the user as a verified live user based on a successful match between the converted text and the generated alphanumeric phrase. In an embodiment, if 90 percent or more characters are matched while performing semantic analysis, the processor may identify the match as successful. In yet another embodiment, if 70 percent or more characters are matched while performing semantic analysis, the processor may identify the match as successful. The processor may generate a comparison score as a result of the comparison. For example, the processor may generate the comparison score based on the percentage of characters being matched. If the generated comparison score is above a predetermined threshold value, the processor determines a successful match of the comparison. The comparison score acts as an indicator of how well the texts have matched one another. When this score is higher than the set threshold, it indicates that there is a significant alignment between the converted text and the alphanumeric phrase. In an embodiment, the predetermined threshold value may be determined based on a machine learning model like a binary classification model (e.g., logistic regression, SVM, decision trees) trained with a dataset that includes examples where the converted text from speech to text matches the generated alphanumeric phrase along with the comparison score, examples where the converted text does not match the generated alphanumeric phrase along with the comparison score, and the like. The examples may include variations in length, complexity, and format of the alphanumeric, variation in accents, pronunciation of the alphanumeric phrases. These examples may serve as input for the machine learning model and the objective of the model may be to learn a decision boundary to generate a threshold value. The processor may evaluate the model's performance by selecting different thresholds and the model may determine optimized threshold upon continuously being trained. The user device may recommend the user for an additional verification if the generated comparison score is below the predetermined threshold.

Figure 4:
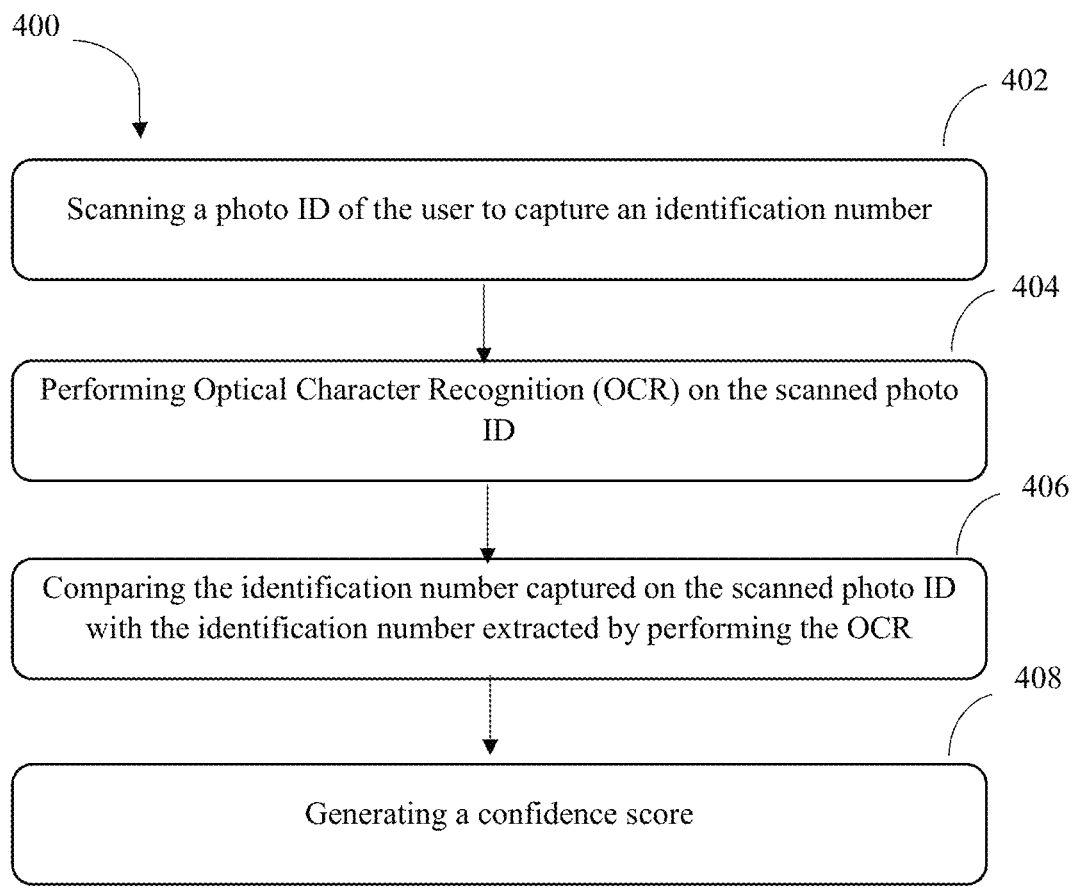
FIG. 4 illustrates a method for user verification, in accordance with an embodiment of the present subject matter.

Referring to FIG. 4, a method 400 for a user verification is shown. In an embodiment, the processor may perform the method 200 along with the method 400 for authenticating the user. At step 402, in an embodiment, the user's photo ID may be scanned using the built-in scanner or camera on the user device. When the user initiates the verification process, the user device scans the photo ID to capture an identification number of the user. The camera or scanner of the user device takes a picture of the photo ID after the user initiates the verification process. In an example, the user may be instructed to place the user ID correctly within the scanning region. To obtain relevant information for verification, the scanned image may be processed in an embodiment. To make sure the ID's details are readable and recognisable, image enhancement processes like cropping, resizing, and enhancing clarity may be used. The processor may capture an image of the user's photo ID, focusing on the area that contains the identification number. The identification number may comprise one or more of alphabets, numerals, special characters, and a combination thereof.

The processor performs an Optical Character Recognition (OCR) on the scanned photo ID of the user to extract the identification number, at step 404. OCR algorithms may analyse image using techniques such as but not limited to pattern recognition, edge detection, and machine learning to extract the identification number. The OCR algorithms identify features that represent different characters, including their shapes, lines, curves, and angles. The OCR algorithms may identify specific area in the image of the photo ID where the identification number is located. The image is processed to convert the characters into machine-readable text. Once, the processor performs the OCR to extract the identification number, the processor, at step 406 compare the identification number captured during the scanning process with the identification number extracted by performing the OCR to verify an identity of the user. The processor may perform a character-by-character matching while comparing the identification numbers. The comparison process may be case-insensitive to account for potential variations in capitalization. The processor, at step 408, generates a confidence score to indicate an outcome of the comparison. The processor identifies a match when the generated confidence score is greater than or equal to a predetermined score. The confidence score acts as an indicator of how well identification numbers have matched one another. When this score is equal to or higher than the set predetermined score, it indicates that there is a significant alignment between the identification numbers. The processor may prompt the user for an additional verification if the generated confidence score is lower than the predetermined score. The one or more steps of FIG. 2 performed at the user device provide one or more advantages like improved user experience, improved processing speed and the like. For example, the user experience may not be impacted even if the network bandwidth is low. In yet another embodiment, the OCR process may be performed at the system 102. For example, the scanned photo ID may be uploaded at the system 102 and the one or more steps to perform the OCR, as discussed above, may take place at the system 102.

Figure 5:
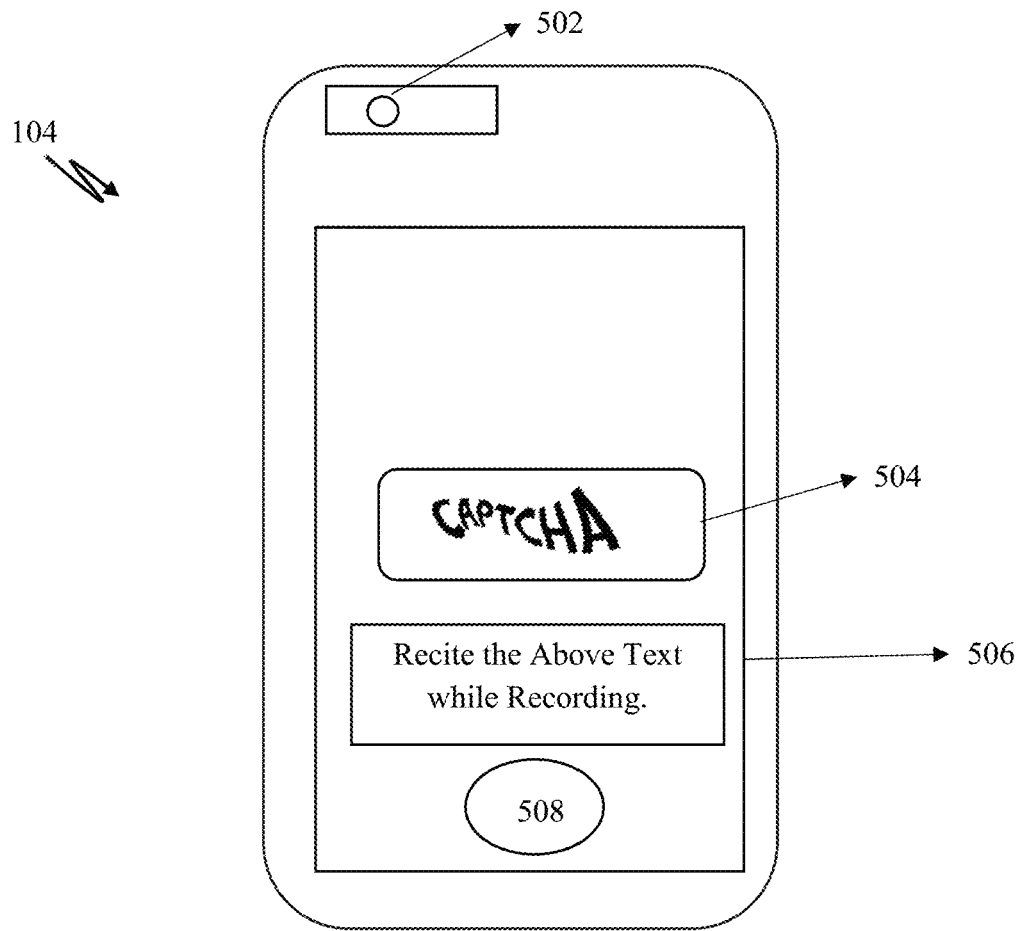
FIG. 5 illustrates an interface of the user device displaying the generated random task, in accordance with an embodiment of the present subject matter.

Referring to FIG. 5, In an embodiment, FIG. 5 illustrates an interface of the user device 104 displaying the random task with the help of visual cue. The random task is to recite the alphanumeric phrase 504 by the user while recording the video. The user device 104 may include a camera 502 that may be utilised to record the video. The user device 104 may include one or more cameras (not shown in the figure) used to scan the photo ID of the user. The user device 104 may prompt the user through one or more dialogue boxes like 506 to recite the alphanumeric phrase 504 while recording the video. The user may record the video via a graphical user interface 508. In yet another embodiment, referring to FIG. 6, the user device 104 may prompt the through one or more dialogue boxes like 604 to perform a hand gesture as described in 602 while recording the video.

The method and device disclosed in the present disclosure have numerous applications like but not limited to: 1. Financial Services: in order to prevent unauthorised access, online banking ensures that users are active during login and financial activities. 2. Healthcare: authenticating access to patient records by healthcare professionals in order to safeguard private medical data. During remote medical consultations, telemedicine secures patient and healthcare provider authentication. 3. Corporate Offices: by confirming employees' identities during access control, physical security is improved. 4. Data centres: using biometric liveness checks to control access to server rooms and sensitive data. 5. Education: secure exams, identifying students who are taking exams from a distance in order to stop cheating on online exams. 6. Accommodations and travel: like in hotel check-in, to avoid fraud, the check-in process involves verifying visitors' identity, and many more.

The method and device disclosed in the present application has various advantages and the same are listed below:

User verification independent of external network: In contrast to traditional online verification procedures carried out via network connections, user verification occurs in an offline context. The technique enables a verification procedure that runs without the aid of external network connections. This strategy, which represents a substantial change from traditional online verification approaches, not only improves user privacy but also offers a reliable form of identity validation while reducing dependency on external infrastructure.

Improved processing speed and user experience: The one or more processes of disclosed method carried out at the user device, locally, offer various benefits, such as an enhanced user experience and faster processing speed of the data.

Low Latency: The one or more steps of the disclosed method that are performed locally on the user device therefore low latency and hence faster user authentication.

Reduced bandwidth usage: Since there is no need to send data to a remote server, mobile data and bandwidth are preserved.

Enhanced Security: By requiring users to pass multiple authentication stages, multi-step verification offers an extra layer of security. Identity theft and unauthorised access are less likely as a result.

Prevents Identity Fraud: By confirming liveness of the user and active participation, attackers are prevented from exploiting still photos, recordings, or manipulative media to pose as the real user. Liveness checks counteract spoofing attempts, where attackers might use photos, videos, or masks to trick facial recognition systems.

Robust Identity Verification: With multiple steps, the device can verify different aspects of a user's identity, such as possession of a physical photo ID, liveness, or perhaps a biometric scan.

Although implementations for methods and device for user verification have been described in language specific to structural features and/or methods, it is to be understood that the appended claims are not necessarily limited to the specific features or methods described. Rather, the specific features and methods are disclosed as examples of implementations for user verification.

The invention claimed is:

1. A method for verification of a user, the method comprising:

scanning, by a processor, a photo Identity Document (ID) of the user, wherein the photo ID of the user includes a user image and an identification number, and wherein the scanning of the photo ID captures the identification number;

extracting, by the processor, the user image from the scanned photo ID and the identification number, wherein the identification number is extracted by performing Optical Character Recognition (OCR) on the scanned photo ID;

generating a random task to be performed by the user;

recording a video to capture execution of the generated random task;

generating a first score upon execution of the generated random task;

processing the recorded video to extract an audio segment and one or more image frames from the recorded video;

validating the random task performed by the user based on the extracted audio segment and the extracted one or more image frames;

identifying a user image from the extracted one or more image frames;

comparing the extracted user image from the scanned photo ID with the identified user image;

generating a second score based on the comparison of the extracted user image from the scanned photo ID with the identified user image, wherein the second score indicates a similarity between the extracted user image from the scanned photo ID and the identified user image; and authenticating the user by:

determining a successful match between the extracted user image from the scanned photo ID and the identified user image from the extracted one or more image frames, and a successful execution of the generated random task, wherein the successful execution of the random task is indicated when the first score is above a first predetermined threshold, wherein the successful match is obtained when a combined comparison score is above a second predetermined threshold, and wherein the combined comparison score includes the first score and the second score; and comparing the identification number captured while scanning the photo ID with the identification number extracted by performing the OCR to verify an identity of the user.

2. The method as claimed in claim 1 further comprising:
recommending the user for an additional verification step if the combined comparison score is below the second predetermined threshold.

3. The method as claimed in claim 1, wherein the generated random task includes one or more of reciting an alphanumeric phrase, head motion, eye blinking, hand gesture, and lip movement.

4. The method as claimed in claim 3, further comprising:
converting the extracted audio segment into corresponding text using a machine learning algorithm:
comparing the converted corresponding text with the alphanumeric phrase; and
authenticating the user as a verified live user based on a successful match between the alphanumeric phrase and the corresponding text.

5. The method as claimed in claim 4, wherein converting the extracted audio into the corresponding text further comprising:
identifying a language of speech in the extracted audio segment by using one or more language detection algorithms; and
selecting a language model based on the identified language to determine one or more of an accent, a pronunciation, and a speech pattern of the user.

6. The method as claimed in claim 1, further comprising:
prompting the user to select a language from one or more languages for providing the generated random task on a user device.

7. The method as claimed in claim 6, wherein the one or more languages are displayed on the user device based on at least one of a location of the user device and a user profile.

8. The method as claimed in claim 1, further comprising:
generating a confidence score based on the comparison of the identification number captured while scanning the photo ID with the identification number extracted by performing the OCR and identifying a match when the confidence score is greater than or equal to a third predetermined score.

9. The method as claimed in claim 8, further comprising:
prompting the user for an additional verification step if the generated confidence score is lower than the third predetermined score.

10. The method as claimed in claim 1, wherein processing the video further comprises:
detecting one or more actions performed by the user, wherein the one or more actions include eye blink, lip movement, head motion, and hand gesture.

11. The method as claimed in claim 1, wherein the generated random task is performed in front of a camera of the user device.

12. The method as claimed in claim 1, wherein the user is authenticated as a verified live user.

13. The method as claimed in claim 1, wherein identifying the user image from the one or more image frames comprises:

extracting a user image from the one or more image frames;

determining one or more facial features of the user in the extracted user image; and identifying the image of the user based on the determined one or more facial features of the user.

14. A device for a user verification, comprising:

a memory; and a processor communicatively coupled with the memory, wherein the processor is configured to execute one or more instructions stored in the memory to:

scan a photo Identity Document (ID) of the user, wherein the photo ID of the user includes a user image and an identification number, and wherein scanning of the photo ID captures the identification number;

extract the user image from the scanned photo ID and the identification number, wherein the identification number is extracted by performing Optical Character Recognition (OCR) on the scanned photo ID;

generate a random task to be performed by the user;

record a video to capture execution of the generated random task;

generate a first score upon execution of the generated random task;

process the recorded video to extract an audio segment and one or more image frames from the recorded video;

validate the random task performed by the user based on the extracted audio segment and the extracted one or more image frames;

identify a user image from the extracted one or more image frames;

compare the extracted user image from the scanned photo ID with the identified user image;

generate a second score based on the comparison of the extracted user image from the scanned photo ID with the identified user image, wherein the second score indicates a similarity between the extracted user image from the scanned photo ID and the identified user image; and authenticate the user by:

determine a successful match between the extracted user image from the scanned photo ID and the identified user image from the extracted one or more image frames, and successful execution of the generated random task, wherein the successful execution of the random task is indicated when the first score is above a first predetermined threshold, wherein the successful match is obtained when a combined comparison score is above a second predetermined threshold, and wherein the combined comparison score includes the first score and the second score; and compare the identification number captured while scanning the photo ID with the identification number extracted by performing the OCR to verify an identity of the user.

* * * * *